(12) United States Patent
Vanbrabant

(10) Patent No.: US 7,431,135 B2
(45) Date of Patent: Oct. 7, 2008

(54) STROKE DEPENDENT DAMPING

(75) Inventor: Ronny Vanbrabant, Heushen-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 574 days.

(21) Appl. No.: 10/976,252

(22) Filed: Oct. 27, 2004

(65) Prior Publication Data
US 2006/0086581 A1 Apr. 27, 2006

(51) Int. Cl.
F16F 9/50 (2006.01)
F16F 9/516 (2006.01)

(52) U.S. Cl. ............... 188/282.5; 188/282.1; 188/313; 188/316

(58) Field of Classification Search ............... 188/281, 188/282.1, 282.2, 282.4, 282.3, 282.5, 282.6, 188/284, 313, 315, 316
See application file for complete search history.

(56) References Cited

U.S. PATENT DOCUMENTS 2,826,960 A * 4/1958 Lucien et al. ............... 188/269
3,063,518 A * 11/1962 Stark ....................... 188/282.1
3,256,960 A * 6/1966 Casimir ..................... 188/317
6,264,015 B1 * 7/2001 De Kock ................... 188/282.5
6,352,145 B1 * 3/2002 DeMolina et al. ......... 188/282.1
2005/0056501 A1 * 3/2005 de Molina .................. 188/284

FOREIGN PATENT DOCUMENTS

JP 04171329 A * 6/1992

* cited by examiner

Primary Examiner—Thomas J Williams
(74) Attorney, Agent, or Firm—Harness, Dickey & Pierce, PLC

(57) ABSTRACT

A two-stage shock absorber has a pressure tube within which a piston assembly is slidably disposed. A piston rod is attached to the piston assembly and extends out of the pressure tube. A sleeve is slidably disposed within the pressure tube and engages the piston rod. After a specified amount of movement of the piston assembly with respect to the pressure tube in an extension movement of the shock absorber, the sleeve engages a plurality of spirally positioned bores on the piston rod and reduces the fluid flow through the valve assembly to progressively switch the shock absorber from soft damping to firm damping. In another embodiment the sleeve engages a spiral groove of variable depth on the piston rod to reduce the fluid flow through the valve assembly to progressively switch the shock absorber from soft damping to firm damping. In yet another embodiment of the present invention, the sleeve engages a tapered slot of variable cross-section to reduce the fluid flow through the valve assembly to progressively switch the shock absorber from soft damping to firm damping.

6 Claims, 7 Drawing Sheets

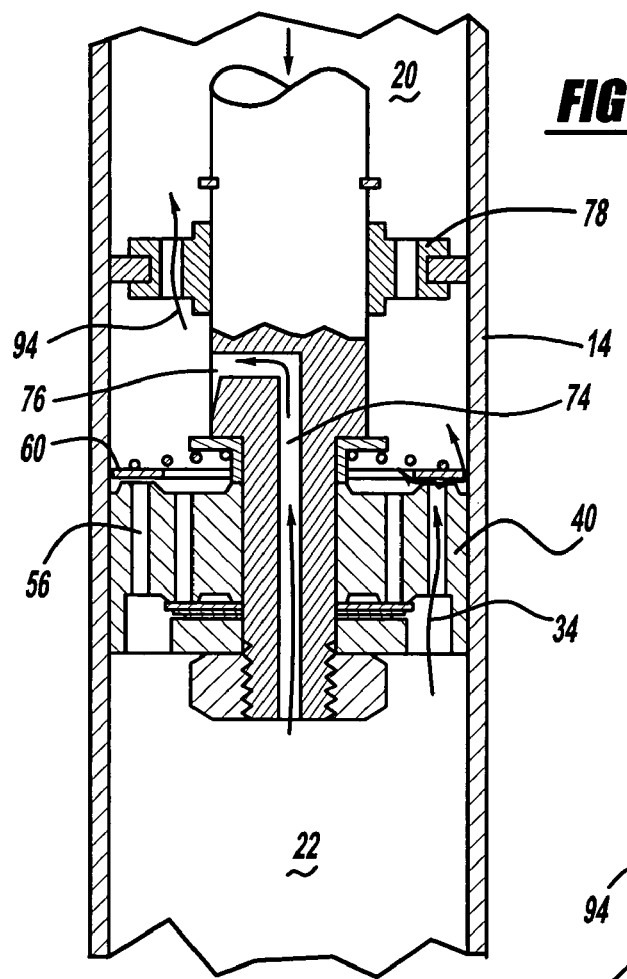
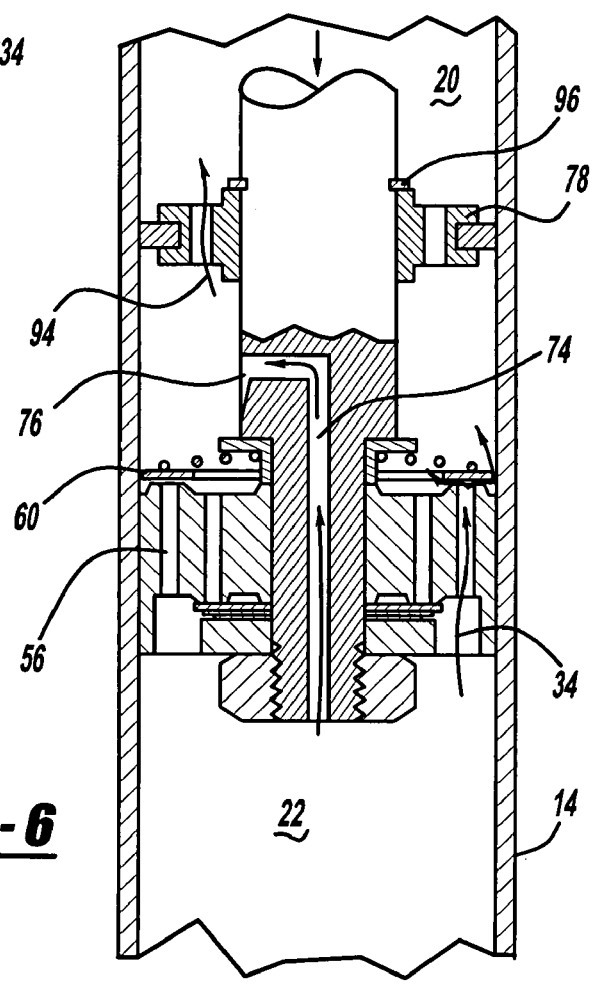

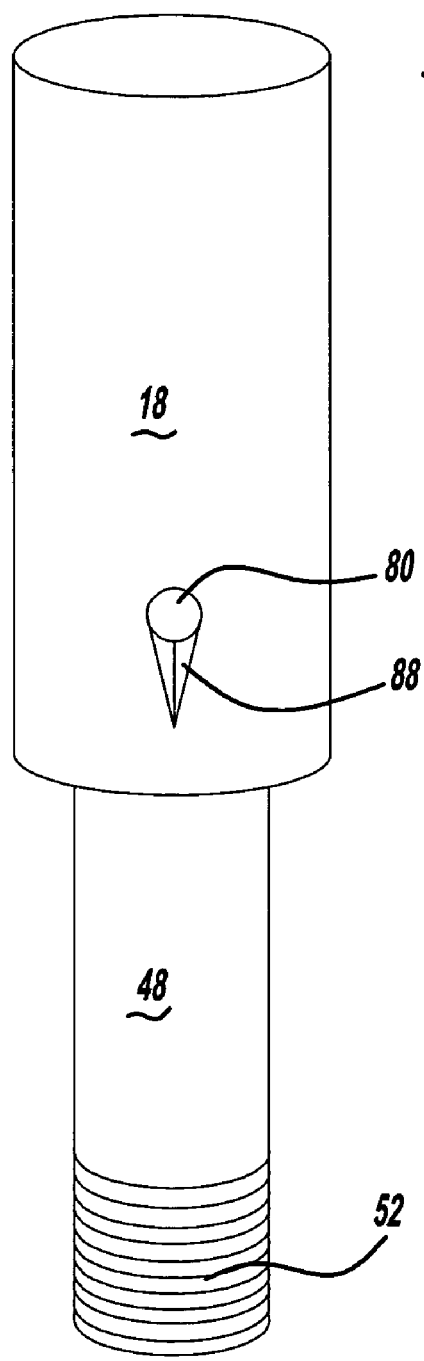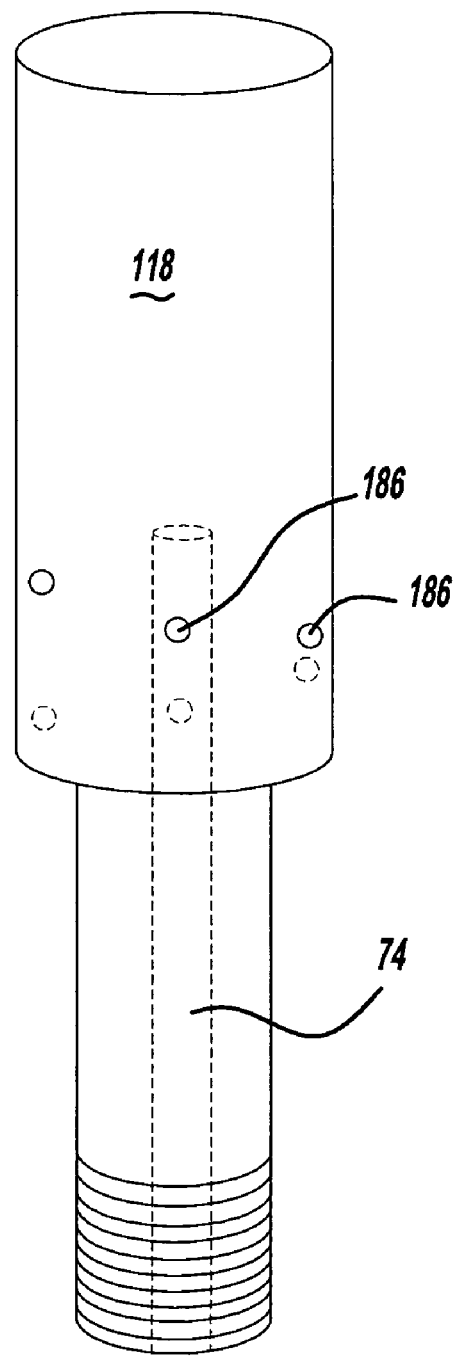

STROKE DEPENDENT DAMPING

FIELD OF THE INVENTION

The present invention relates to a hydraulic damper or shock absorber adapted for use in a suspension system such as the systems used for automotive vehicles. More particularly, the present invention relates to a hydraulic damper having a two-stage damping characteristic where a relatively low level damping is provided for small amplitudes of movement and a relatively high level of damping is provided for large amplitudes of movement.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension stroke of the hydraulic damper and a second valving system is incorporated for generating damping force during the compression stroke of the hydraulic damper.

Various types of damping force generating devices have been developed to generate desired damping forces in relation to the speed and/or the displacement of the piston within the cylinder. These multi-force damping force generating devices have been developed to provide a relatively small or low damping force during the normal running of the vehicle and a relatively large or high damping force during maneuvers requiring extended suspension movements. The normal running of the vehicle is accompanied by small or fine vibrations of the un-sprung mass of the vehicle and thus the need for a soft ride or low damping characteristic of the suspension system to isolate the sprung mass from these vibrations. During a turning or braking maneuver, as an example, the sprung mass of the vehicle will attempt to undergo a relatively slow and/or large vibration which then requires a firm ride or high damping characteristics of the suspension system to support the sprung mass and provide stable handling characteristics to the vehicle. Thus, these multi-force damping force generating devices offer the advantage of a smooth steady state ride by eliminating the high frequency/small excitations from the sprung mass while still providing the necessary damping or firm ride for the suspension system during vehicle maneuvers causing larger excitations of the sprung mass.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides damping which varies according to the stroke amplitude. Soft damping is provided for small strokes and firm damping is provided for large strokes. The variable damping is provided by a sliding sleeve that is frictionally held in place in the pressure cylinder. When the shock absorber undergoes a small stroke, the sliding sleeve remains inactive and the fluid flows through two separate flow paths to provide a soft damping. When the shock absorber undergoes a large stroke, the sliding sleeve moves to progressively close off one of the two flow paths which in turn provides a firm damping. Various design iterations are disclosed for both mono-tube and double tube shock absorbers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an enlarged cross-sectional side view illustrating the piston assembly of the shock absorber shown in FIG. 1 during a small compression stroke of the shock absorber;

FIG. 6 is an enlarged cross-sectional side view illustrating the piston assembly of the shock absorber shown in FIG. 1 during a large compression stroke of the shock absorber;

FIG. 7 is an enlarged view of the metering slot shown in FIGS. 1-6;

FIG. 8 is an enlarged cross-sectional side view similar to FIG. 7 but illustrating a metering system in accordance with another embodiment of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
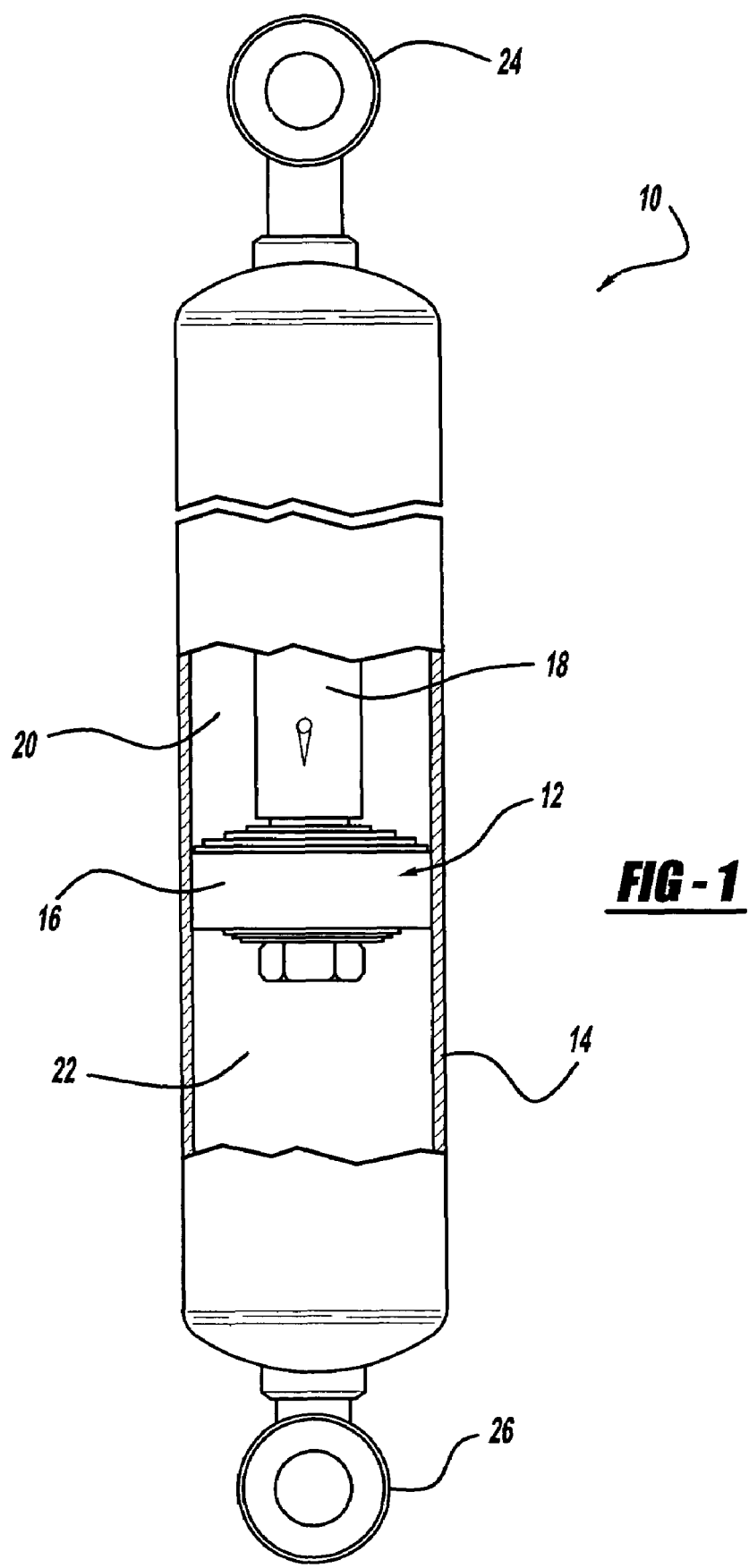
FIG. 1 is a cross-sectional side view of a mono-tube shock absorber incorporating the multi-force damping force generating device in accordance with the present invention.

Referring now to the drawings in which the like reference numerals designate like or corresponding parts throughout the several views, there is shown in FIG. 1 a two-stage mono-tube shock absorber which incorporates the multi-force damping force generating device in accordance with the present invention and which is designated generally by the reference numeral 10. Shock absorber 10 is a mono-tube design and comprises a piston rod assembly 12 and a pressure tube 14. Piston rod assembly 12 includes a piston valve assembly 16 and a piston rod 18. Valve assembly 16 divides pressure tube 14 into an upper working chamber 20 and a lower working chamber 22. Piston rod 18 extends out of pressure tube 14 and includes a fitting 24 for attachment to one of the sprung or unsprung mass of the vehicle. Pressure tube 14 is filled with fluid and includes a fitting 26 for attachment to the other of the sprung or unsprung masses of the vehicle. Thus, suspension movements of the vehicle will cause extension or compression movement of piston rod assembly 12 with respect to pressure tube 14 and these movements will be dampened due to the restricted fluid flow between working chambers 20 and 22 through piston valve assembly 16.

Figure 2:
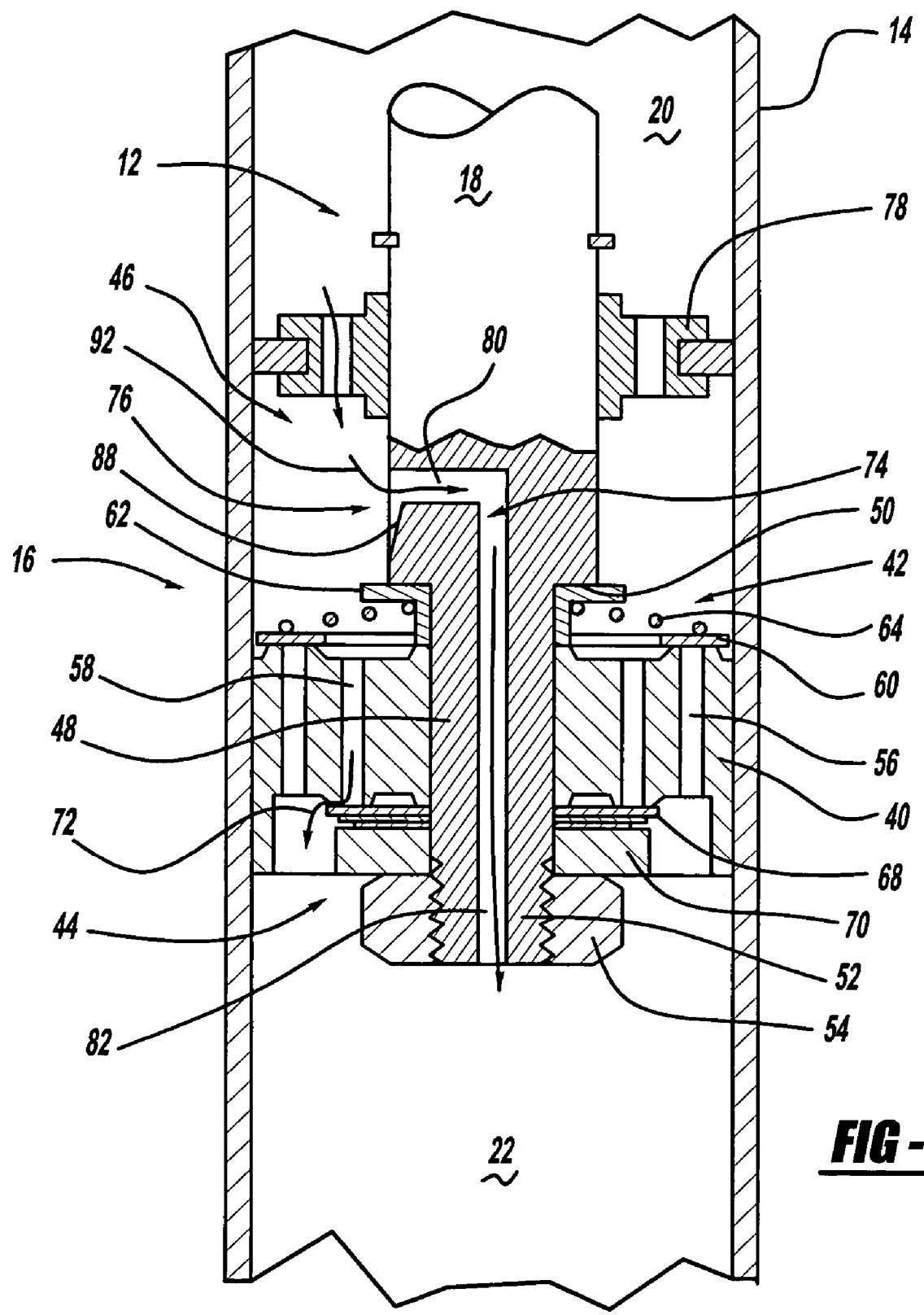
FIG. 2 is an enlarged cross-sectional side view illustrating the piston assembly of the shock absorber shown in FIG. 1 during a small extension stroke of the shock absorber.

Referring now to FIG. 2, piston valve assembly 16 is attached to piston rod 18 and comprises a piston body 40, a compression valve assembly 42, an extension or rebound valve assembly 44 and a sliding valve assembly 46. Piston rod 18 includes a reduced diameter section 48 located on the end of piston rod 18 disposed within pressure tube 14 to form a shoulder 50 for mounting the remaining components of piston valve assembly 16. Piston body 40 is located on reduced diameter section 48 with compression valve assembly 42 being located between piston body 40 and shoulder 50 and with rebound valve assembly 44 being located between piston body 40 and a threaded end 52 of piston rod 18. A retaining nut 54 maintains the assembly of these components. Piston body 40 defines a plurality of compression flow passages 56 and a plurality of rebound flow passages 58.

Compression valve assembly 42 comprises a compression valve plate 60, a compression support plate 62 and a compression spring 64. Valve plate 60 is disposed adjacent to piston body 40 to cover the plurality of compression flow passages 56. Support plate 62 is disposed adjacent shoulder 50 and compression spring 64 is disposed between valve plate 60 and support plate 62 to hold valve plate 60 against piston body 40 to close passages 56. During a compression stroke of shock absorber 10, fluid pressure builds up in lower working chamber 22 until the fluid pressure applied to valve plate 60 overcomes the load exerted on valve plate 60 by compression spring 64. Compression spring 64 will compress to allow compression support plate 62 to unseat from piston body 40 to allow fluid flow from lower working chamber 22 to upper working chamber 20 through compression flow passages 56 as shown by the arrows 34 in FIGS. 5 and 6.

Rebound valve assembly 44 comprises a plurality of valve plates 68, a rebound support plate 70 and piston nut 54. Valve plates 68 are disposed adjacent to piston body 40 to cover the plurality of rebound flow passages 58. Support plate 70 is disposed between piston nut 54 and valve plates 68. Piston nut 54 is threaded onto end 52 of piston rod 18 to retain support plate 70 and hold valve plates 68 against piston body 40 to close passages 58. During an extension stroke of shock absorber 10, fluid pressure builds up in upper working chamber 20 until the fluid pressure applied to valve plates 68 through passages 58 overcomes the bending load of valve plates 68. Valve plates 68 elastically deflect around the outer edge of support plate 70 to allow fluid to flow from upper working chamber 20 to lower working chamber 22 as shown by arrows 72 in FIGS. 2-4.

Sliding valve assembly 46 comprises a flow passage 74, a metering slot 76 and a sliding sleeve 78. Flow passage 74 extends through piston rod 18 and includes a radial passage 80 and an axial passage 82 which opens into lower working chamber 22. Metering slot 76 includes a tapered slot 88 extending axially along the outer surface of piston rod 18. Sliding sleeve 78 is slidingly received within pressure tube 14 and slidingly received on piston rod 18 to provide the multi-stage damping characteristics for shock absorber 10.

Figure 3:
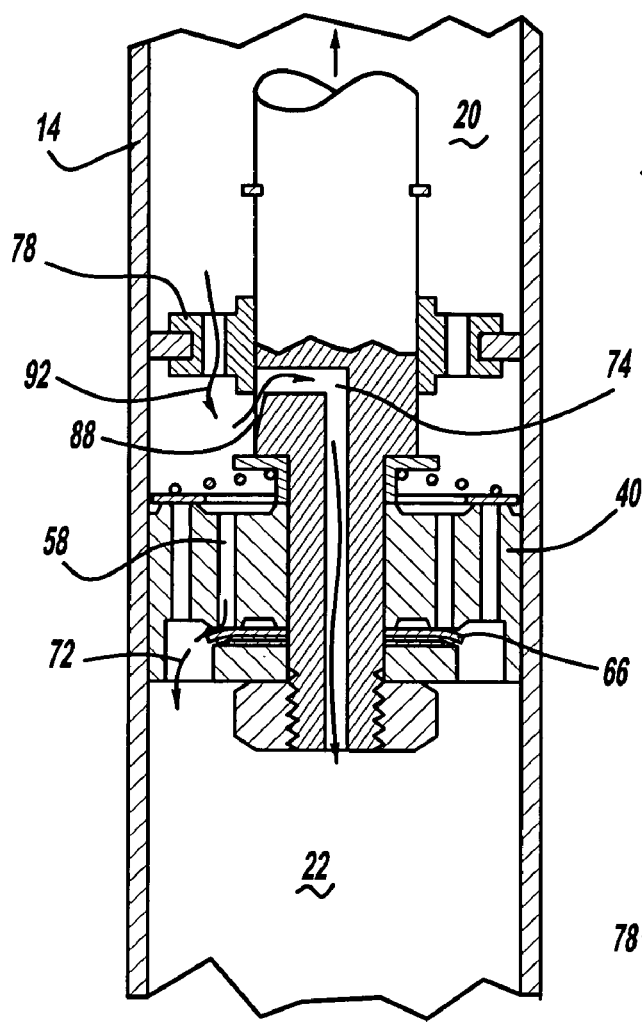
FIG. 3 is an enlarged cross-sectional side view illustrating the piston assembly of the shock absorber shown in FIG. 1 during a larger extension stroke of the shock absorber.
Figure 4:
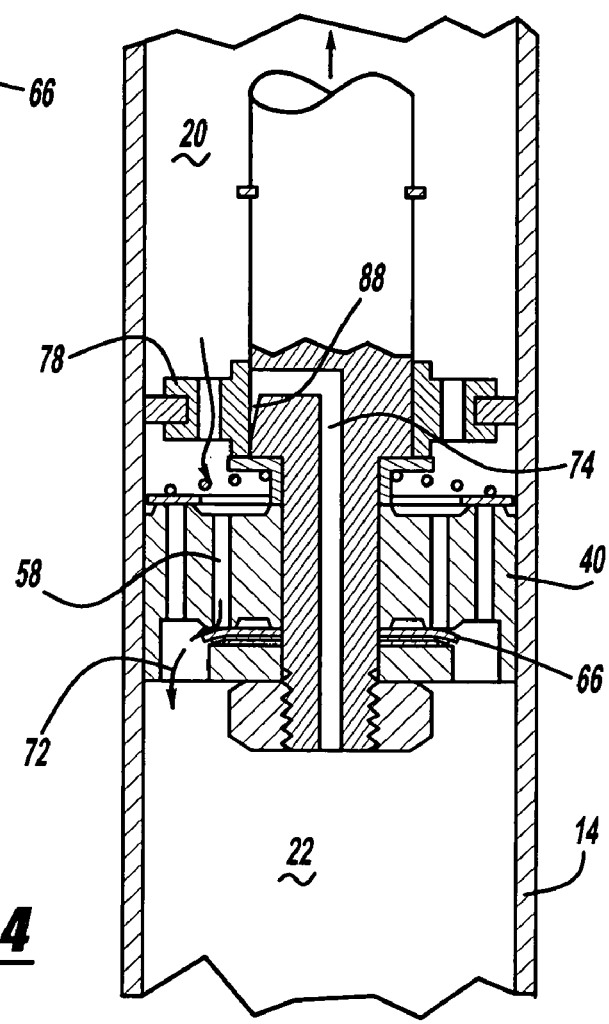
FIG. 4 is an enlarged cross-sectional side view illustrating the piston assembly of the shock absorber shown in FIG. 1 during an even larger extension stroke of the shock absorber.

FIGS. 2 through 6 illustrate the various damping characteristics provided for by piston rod assembly 12 of shock absorber 10. FIG. 2 illustrates a small amplitude extension, FIG. 3 illustrates a larger amplitude extension, FIG. 4 illustrates an even larger amplitude extension, FIG. 5 illustrates a small amplitude compression and FIG. 6 illustrates a large amplitude compression for shock absorber 10.

A small amplitude extension of shock absorber 10 is illustrated in FIG. 2 with arrows 72 and 92 depicting the fluid flow. During small amplitudes of extension, sliding sleeve 78 will only move a small amount with respect to piston rod 18 due to the friction with pressure tube 14 and it does not restrict fluid flow through passage 74 and metering slot 76. Fluid flow from upper working chamber 20 of pressure tube 14 into lower working chamber 22 of pressure tube 14 occurs through two generally parallel paths. The first path is numbered 72 and extends from upper working chamber 20 of pressure tube 14 through passages 58 unseating valve plates 68 from piston body 40 to enter lower working chamber 22 of pressure tube 14. Simultaneously, fluid flows through the second flow path as depicted by arrows 92. Fluid flow leaves upper working chamber 20 through passage 74 metering slot 76 and through to also enter lower working chamber 22 of pressure tube 14. These dual parallel flow paths 72 and 92, will thus provide a relatively soft ride for small movements of shock absorber 10.

A larger amplitude extension of shock absorber 10 is illustrated in FIG. 3 with arrows 72 and 92 depicting fluid flow. During the larger amplitudes of extension, sliding sleeve 78 will move enough to cover a portion of passage 74 and possibly a portion of tapered slot 88 due to the friction with pressure tube 14 and will begin progressively closing fluid passage 74. As shown in FIGS. 3 and 7, tapered slot 88 of metering slot 76 permits a gradual or progressive closing of fluid passage 74 which provides the advantage of the major reduction or elimination of the switching noise typical with a dual-stage damping device. Fluid flow from upper working chamber 20 of pressure tube 14 into lower working chamber 22 of pressure tube 14 still occurs through two generally parallel paths but the second path is progressively being closed off as a function of the amplitude of the stroke. The shape of tapered slot 88 thus provides the shock absorber designer the option of defining the curve between the soft damping characteristics of shock absorber 10 and the firm damping characteristics of shock absorber 10 and no longer requires him to accept a step function. First path 72 extends from upper working chamber 20 of pressure tube 14 through passage 58 unseating valve plates 66 from piston body 40 to enter lower working chamber 22 of pressure tube 14. Simultaneously, fluid flow through second flow path 92 by leaving upper working chamber 20 through metering slot 76 and through passage 74 to also enter lower working chamber 22 of pressure tube 14. The amount of fluid flowing through second flow path 92 will be determined by the position of sliding sleeve 78 with respect to tapered slot 88 and the design of tapered slot 88.

An even larger amplitude extension of shock absorber 10 is illustrated in FIG. 4 with arrows 72 depicting fluid flow. During large amplitudes of extension, sliding sleeve 78 remains in position due to friction and entirely covers passage 74 and tapered slot 88. Fluid flow from upper working chamber 20 of pressure tube 14 into lower working chamber 22 of pressure tube 14 occurs through only one path which is path 72. As stated above, path 72 extends from upper working chamber 20 of pressure tube 14 through passages 58 unseating valve plates 66 from piston body 40 to enter lower working chamber 22 of pressure tube 14. Flow path 92, shown in FIGS. 2 and 3, is blocked due to the position of sliding sleeve 78. The single flow path will thus provide a relatively firm ride for larger movements of shock absorber 10.

A small amplitude compression of shock absorber 10 is illustrated in FIG. 5 with arrows 34 and 94 depicting the fluid flow. During small amplitudes of compression, sliding sleeve 78 will move only a small amount with respect to piston rod 18 due to the friction with pressure tube 14. Fluid flow from lower working chamber 22 of pressure tube 14 into upper working chamber 20 of pressure tube 14 occurs through two generally parallel paths. The first path is numbered 34 and extends from lower working chamber 22 of pressure tube 14 through passages 56 unseating valve plate 60 from piston body 40 to enter upper working chamber 20 of pressure tube 14. Simultaneously, fluid flows through a second flow path as depicted by arrows 94. Fluid flow leaves lower working chamber 22 through passage 74 and through metering slot 76 to enter upper working chamber 20 of pressure tube 14.

A large amplitude compression of shock absorber 10 is illustrated in FIG. 6 with arrows 34 and 94 depicting fluid flow. During large amplitudes of compression, sliding sleeve 78 remains in position due to friction and a retaining ring 96 contacts sliding sleeve 78. Fluid flow from the lower working chamber 22 of pressure tube 14 into upper working chamber 20 of pressure tube 14 occurs through the same two flow paths described above for small compression movement soft shock absorber 10 as shown in FIG. 5. The multi-force damping characteristics for shock absorber 10 of this embodiment only effect extension movement of shock absorber 10 and not compression movements.

Referring now to FIG. 8, a piston rod 118 in accordance with another embodiment of the present invention is illustrated. Piston rod 118 is designed to replace piston rod 18 in shock absorber 10 and thus the discussion above of shock absorber 10 also applies to piston rod 118. The difference between piston rod 118 and piston rod 18 is in the manner that fluid flows through passage 74.

Piston rod 118 defines a series of bores 186 extending radially through piston rod 118 to open into passage 74. The series of bores 186 are positioned or created in a helical pattern which extends axially along piston rod 118. Sliding sleeve 78 is slidingly received within pressure tube 14 and slidingly received on piston rod 118, similar to piston rod 18, to provide the multi-stage damping characteristics for shock absorber 10.

During small amplitudes extensions of shock absorber 10, sliding sleeve 78 will move only a small amount with respect to piston rod 118 due to the friction with pressure tube 14 and thus it does not restrict fluid flow through passage 74 and all of bores 186. The fluid flow is similar to that shown in FIG. 2 for piston rod 18.

During larger amplitude extensions of shock absorber 10, sliding sleeve 78 will move enough to cover one or more of bores 186 due to the friction with pressure tube 14 and it will progressively close more and more of bores 186 as it moves axially along piston rod 118. Similar to that shown in FIG. 3, the helical series of spaced bores 186 will permit a gradual closing of the entire passage 74 which provides the advantage of the major reduction or elimination of the switching noise which occurs between soft and firm damping characteristics in a dual-stage damping device. Fluid flow from upper working chamber 20 of pressure tube 14 into lower working chamber 22 of pressure tube 14 still occurs through the two generally parallel flow paths shown by arrows 72 and 92 but the second flow path shown by arrow 92 is progressively being closed off as a function of the amplitude of the stroke. The variable helical pattern of bores 186 thus provides the shock absorber designer the option of defining the curve between the soft damping characteristics of shock absorber 10 and the firm damping characteristics of shock absorber 10 and no longer requires him to accept a step function. The first path shown by arrow 72 extends from upper working chamber 20 of pressure tube 14 through passages 58 unseating valve plates 66 from piston body 40 to enter lower working chamber 22 of pressure tube 14. Simultaneously, fluid flows through the second flow path shown by arrow 92 by leaving upper working chamber 20 through one or more of bores 186 and through passage 74 to also enter lower working chamber 22 of pressure tube 14. The amount of fluid flowing through the second flow path shown by arrow 92 will be determined by the position of sliding sleeve 78 and the number of bores 186 which sliding sleeve 78 covers.

During even larger amplitude extensions of shock absorber 10, sliding sleeve 78 will move enough to cover all of bores 186. Fluid flow from upper working chamber 20 of pressure tube 14 into lower working chamber 22 of pressure tube 14 occurs only through the first flow path depicted by arrow 72. This single flow path will thus provide a relatively firm ride. The fluid flow is similar to that shown in FIG. 4 for piston rod 18.

Small amplitude compression and large amplitude compression of shock absorber 10 is the same as that illustrated above in FIGS. 5 and 6 for piston rod 18, respectively. During all compression strokes for shock absorber 10, all bores 186 are open providing for the dual path fluid flow depicted by arrows 34 and 94.

Figure 9:
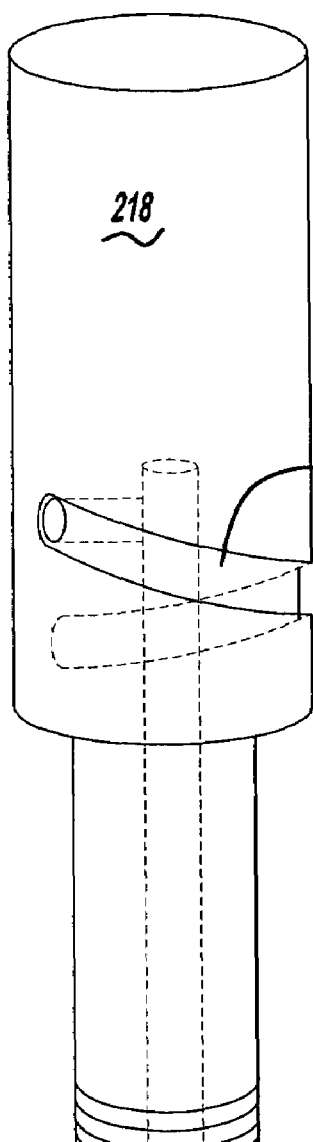
FIG. 9 is an enlarged cross-sectional side view similar to FIG. 8 but illustrating a metering system in accordance with another embodiment of the present invention.

Referring now to FIG. 9, a piston rod 218 in accordance with another embodiment of the present invention is illustrated. Piston rod 218 is designed to replace piston rod 18 in shock absorber 10 and thus the discussion above of shock absorber 10 also applies to piston rod 218. The difference between piston rod 218 and piston rod 18 is in the manner that the fluid flows through passage 74.

Piston rod 218 defines a helical groove 188 extending axially along the outer surface of piston rod 218. Helical groove 188 has a depth that varies continuously over the length of helical groove 188. The depth of helical groove 188 is at its maximum value adjacent passage 74 and at its minimum value at its opposing terminal end. Sliding sleeve 78 is slidingly received within pressure tube 14 and slidingly received on piston rod 218, similar to piston rod 18, to provide the multi-stage damping characteristics for shock absorber 10.

During small amplitude extensions of shock absorber 10, sliding sleeve 78 will only move a small amount with respect to piston rod 218 due to the friction with pressure tube 14 and thus does not restrict fluid flow through groove 188 and passage 74. The fluid flow is similar to that shown in FIG. 2 for piston rod 18.

During larger amplitude extensions of shock absorber 10, sliding sleeve 78 will move enough to cover a portion of groove 188. The movement of sliding sleeve 78 with respect to piston rod 218 will cover more and more of groove 188. Fluid flow will flow from upper working chamber 20 though groove 188 through passage 74 and into lower working chamber 22. The continuously varying depth of groove 188 will permit a gradual closing of the entire passage 74 which provides the advantage of the major reduction or elimination of the switching noise typical with a dual-stage damping device. Fluid flow from upper working chamber 20 of pressure tube 14 into lower working chamber 22 of pressure tube 14 sill occurs through the two generally parallel paths depicted by arrows 72 and 92 but the second path depicted by arrow 92 is progressively being closed off as a function of the amplitude of the stroke. The variable depth of groove 188 thus provides the shock absorber designer the option of defining the curve between the soft damping characteristics of shock absorber 10 and the firm damping characteristics of shock absorber 10 and no longer requires him to accept a step function. The fluid flow is similar to that shown in FIG. 3 for piston rod 18.

Even larger amplitude extensions of shock absorber 10 causes sliding sleeve 78 to cover all of groove 188 to close fluid passage 74. Fluid flow from upper working chamber 20 of pressure tube 14 into lower working chamber 22 of pressure tube 14 occurs only through the path depicted by arrows 72. This single flow path will thus provide a relatively firm ride. The fluid flow is similar to that shown in FIG. 4 for piston rod 18.

Small amplitude compression and large amplitude compression of shock absorber 10 is similar to that illustrated above in FIGS. 5 and 6, respectively, for piston rod 18. During compression strokes for shock absorber 10, groove 188 is open providing for the dual path fluid flow as depicted by arrows 34 and 94. The fluid flow is the same as that shown in FIGS. 5 and 6 for piston rod 18.

Figure 10:
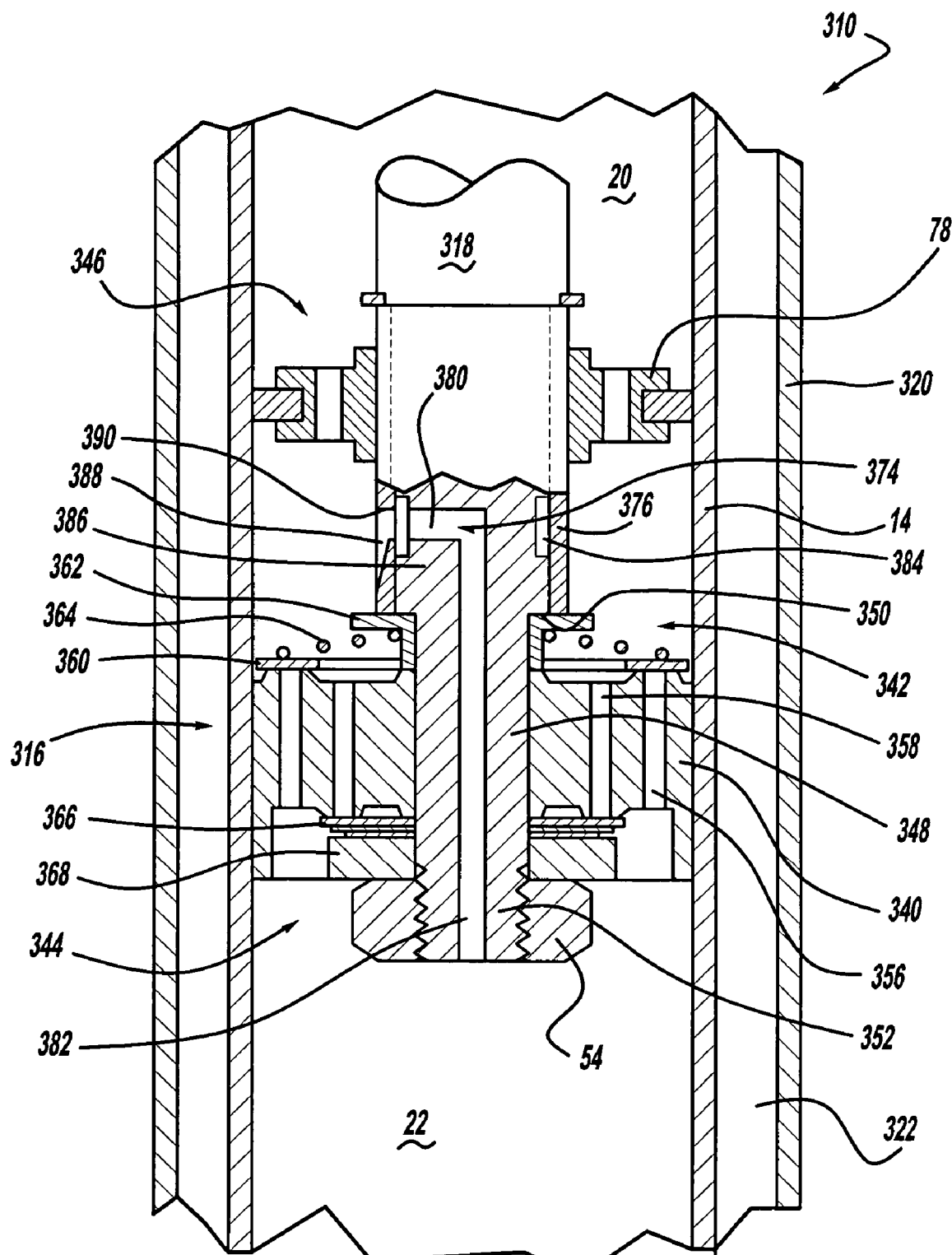
FIG. 10 is an enlarged cross-sectional side view similar to FIG. 2 but illustrating a piston valve assembly in accordance with another embodiment of the present invention.

Referring now to FIG. 10, a piston valve assembly in accordance with another embodiment of the present invention is illustrated and indicated generally by the reference numeral 316. Piston valve assembly 316 is designed for a dual tube shock absorber 310 and is attached to a piston rod 318. As is well known in the art, a dual tube shock absorber includes reservoir tube 320 surrounding pressure tube 14 to form a reservoir chamber 322. A base valve assembly (not shown) is disposed between lower working chamber 22 and reservoir chamber 322. Piston valve assembly 316 comprises a piston body 340, a compression check valve assembly 342, an extension or rebound valve assembly 344 and a sliding valve assembly 346. Piston body 340 is located on a reduced diameter section 348 with compression check valve assembly 342 being located between piston body 340 and a shoulder 350 and with rebound valve assembly 344 being located between piston body 340 and a threaded end 352 of piston rod 318. Retaining nut 54 maintains the assembly of these components. Piston body 340 defines a plurality of compression flow passages 356 and a plurality of rebound flow passages 358.

Compression check valve assembly 342 comprises a compression valve plate 360, a compression support plate 362 and a compression valve spring 364. Valve plate 360 is disposed adjacent to piston body 340 to cover the plurality of compression flow passages 356. Support plate 362 is disposed adjacent to shoulder 350 and valve spring 364 is disposed between support plate 362 and valve plate 360 to hold valve plate 360 against piston body 340 to close passages 356. During a compression stroke of the shock absorber, fluid pressure builds up in lower working chamber 22 until the fluid pressure applied to valve plate 360 through passages 356 overcomes the load being exerted by valve spring 364 opening passages 356 to allow fluid to flow from lower working chamber 22 to upper working chamber 20.

The flow of fluid through compression check valve assembly does not create a damping load for dual tube shock absorber 310, it is designed to replace hydraulic fluid within upper working chamber 20 due to the movement of piston valve assembly 316. The damping characteristics for dual tube shock absorber 310 is provided by a compression valve assembly (not shown) located in the base valve assembly of shock absorber 310 as is well known in the art.

Rebound valve assembly 344 comprises a plurality of valve plates 366, a rebound support plate 368 and piston nut 54. Valve plates 366 are disposed adjacent to piston body 340 to cover the plurality of rebound flow passages 358. Support plate 368 is disposed between piston nut 54 and valve plates 366. Piston nut 54 is threaded onto end 352 of piston rod 318 to retain support plate 368 and hold valve plates 366 against piston body 340 to close passages 358. During an extension stroke of the shock absorber, fluid pressure builds up in upper working chamber 20 until the fluid pressure applied to valve plates 366 overcomes the bending load of valve plates 366. Valve plates 366 elastically deflect around the outer edge of support plate 368 to allow fluid to flow from upper working chamber 20 to lower working chamber 22.

Rebound valve assembly 344 provides the damping characteristics for shock absorber 310 during an extension stroke. As is well known in the art, a rebound check valve assembly (not shown) is located in the base valve assembly of shock absorber 310 to replace hydraulic fluid within lower working chamber 22 during an extension stroke.

Sliding valve assembly 346 is illustrated in conjunction with dual tube shock absorber 310. It is within the scope of the present invention to replace sliding valve assembly 46 with sliding valve assembly 346 for shock absorber 10. Sliding valve assembly 346 comprises a flow passage 374, a collar 376 and sliding sleeve 78. Flow passage 374 extends through piston rod 18 and includes a radial passage 380 and an axial passage 382. Radial passage 380 opens into a groove 384 formed in piston rod 318 and axial passage 382 opens into lower working chamber 22. Collar 376 is located on a reduced diameter section 386 of piston rod 318. Collar 376 defines a tapered slot 388 and a bore 390. Bore 390 is aligned with groove 384 of piston rod 318 such that bore 390 is always in communication with flow passage 374 through groove 384. Sliding sleeve 78 is slidingly received within pressure tube 14 and slidingly received on collar 376 to provide the multiple stage damping characteristics for shock absorber 310.

The various damping characteristics for shock absorber 310 are similar to those shown in FIGS. 2 through 6 for shock absorber 10 except that collar 376 defines tapered slot 388 for shock absorber 310 whereas piston rod 18 defined tapered slot 88 for shock absorber 10. By utilizing collar 376, it simplifies the manufacturing of the tapered slot, it allows for the use of a common piston rod for multiple applications and it allows for changing the design for the fluid flow system.

Similar to FIG. 2, during small amplitude extension movements, sliding sleeve 78 will only move a small amount with respect to collar 376 due to the friction with pressure tube 14 and thus does not restrict fluid flow through passage 374 and bore 390. Fluid flow from upper working chamber 20 into lower working chamber 22 occurs through two paths. The first path extends from upper working chamber 20 through passages 358 unseating valve plates 366 from piston body 340 to enter lower working chamber 22. Simultaneously, fluid flows through the second flow path which extends from upper working chamber 20, through bore 390, through groove 384 and through passage 374 to also enter lower working chamber 22. These dual parallel flow paths will provide a relatively soft ride for small movements of shock absorber 310.

Similar to FIG. 3, during larger amplitudes of extension, sliding sleeve 78 will move enough with respect to collar 376 to cover a portion of bore 390 and possibly a portion of tapered slot 388 due to the friction with pressure tube 14. This movement will progressively close fluid passage 374 due to tapered slot 388. Tapered slot 388 permits a gradual or progressive closing of fluid passage 374 which provides the advantage of a major reduction or elimination of the switching noise typical with a dual-stage damping device. Fluid flow from upper working chamber 20 into lower working chamber 22 occurs through the same two paths, but the second flow path is progressively being closed off as a function of the amplitude of the extension stroke. The shape of tapered slot 388 thus provides the shock absorber designer the option of defining the curve between the soft damping characteristics and the firm damping characteristics for shock absorber 310 and no longer requires him to accept a step function. The first path extends from upper working chamber 20 through passages 358 unseating valve plates 366 from piston body 340 to enter lower working chamber 22. Simultaneously, fluid flows through the second flow path which extends from upper working chamber 20, through bore 390, through groove 384 and through passage 374 to also enter lower working chamber 22. The amount of fluid flowing through the second flow path will be determined by the position of sliding sleeve 78.

Similar to FIG. 4, during large amplitudes of extension, sliding sleeve 78 remains in its position due to friction with pressure tube 14 and sliding sleeve 78 entirely covers bore 390 and tapered slot 388. This closes the second fluid path and fluid flow between upper working chamber 20 and lower working chamber 22 will occur only through the first fluid path. Fluid will flow from upper working chamber 20, through passages 358 unseating valve plates 366 from piston body 340 to enter lower working chamber 22. The flow of fluid through only this single flow path will provide a relatively firm damping characteristic for shock absorber 310.

Similar to FIG. 5, during small amplitude compression movements sliding sleeve 78 will move only a small amount with respect to collar 376 due to friction with pressure tube 14. Fluid flow between lower working chamber 22 and upper working chamber 20 occurs through two generally parallel flow paths. The first flow path extends from lower working chamber 22, through passages 356 unseating valve plate 360 from piston body 340 to enter upper working chamber 20. Simultaneously, fluid flows through a second flow path. Fluid flows from lower working chamber 22, through passage 74, through groove 384, through bore 390 and into upper working chamber 20.

Similar to FIG. 6, during large amplitudes of compression, sliding sleeve 78 remains in position due to friction with pressure tube 14 and retainer 96 contacts sliding sleeve 78. Fluid flow between lower working chamber 22 to upper working chamber 20 occurs through the same two flow paths described above for small compression movements. The multi-force damping characteristics for shock absorber 310 only effect extension movement of shock absorber 310.

Figure 11:
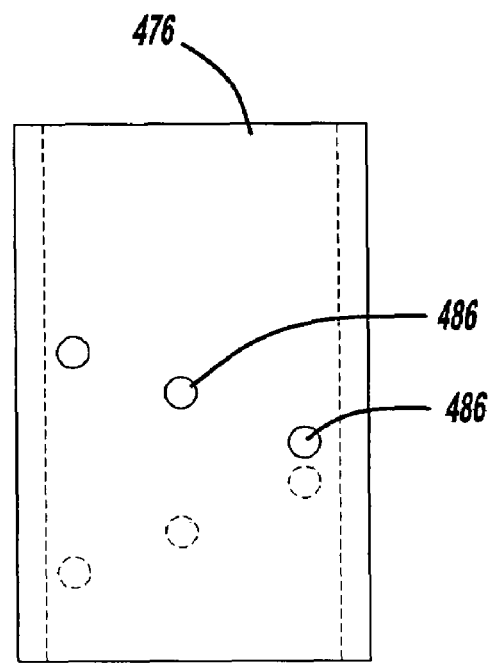
FIG. 11 is an enlarged view of a sleeve incorporating a metering system in accordance with another embodiment of the present invention.

Referring now to FIG. 11, a collar 476 in accordance with another embodiment of the present invention is illustrated. Collar 476 is designed to replace collar 376 and thus the discussion above regarding shock absorber 310 also applies to sleeve 476. The difference between collar 376 and collar 476 is that bore 390 and tapered slot 388 have been replaced with a series of bores 486 extending radially through collar 476 to open into groove 384 and thus passage 374. The series of bores 486 are positioned or created in a helical pattern which extends axially along collar 476. The axial length of groove 384 has to be large enough so that all of bores 486 communicate with groove 384. Sliding sleeve 78 is slidingly received within pressure tube 14 and slidingly received on collar 476, similar to collar 376, to provide multi-stage damping characteristics for shock absorber 310.

During small amplitudes extensions of shock absorber 310, sliding sleeve 78 will move only a small amount with respect to collar 476 due to the friction with pressure tube 14 and thus it does not restrict fluid flow through passage 374, groove 384 and all of bores 486. The fluid flow is similar to that shown in FIG. 2 for piston rod 18.

During larger amplitude extensions of shock absorber 310, sliding sleeve 78 will move enough to cover one or more of bores 486 due to the friction with pressure tube 14 and it will progressively close more and more of bores 486 as it moves axially along collar 476. Similar to that shown in FIG. 3, the helical series of spaced bores 486 will permit a gradual closing of the entire passage 374 which provides the advantage of the major reduction or elimination of the switching noise which occurs between soft and firm damping characteristics in a dual-stage damping device. Fluid flow from upper working chamber 20 of pressure tube 14 into lower working chamber 22 of pressure tube 14 still occurs through the two generally parallel flow paths but the second flow is progressively being closed off as a function of the amplitude of the stroke. The variable helical pattern of bores 486 thus provides the shock absorber designer the option of defining the curve between the soft damping characteristics of shock absorber 310 and the firm damping characteristics of shock absorber 310 and no longer requires him to accept a step function. The first path extends from upper working chamber 20 through passages 358 unseating valve plates 366 from piston body 340 to enter lower working chamber 22. Simultaneously, fluid flows through the second flow path by leaving upper working chamber 20 through one or more of bores 486, through groove 384 and through passage 374 to also enter lower working chamber 22. The amount of fluid flowing through the second flow path will be determined by the position of sliding sleeve 78 and the number of bores 486 which sliding sleeve 78 covers.

During even larger amplitude extensions of shock absorber 310, sliding sleeve 378 will move enough to cover all of bores 486. Fluid flow from upper working chamber 20 into lower working chamber 22 of pressure tube 14 occurs only through the first flow path. This single flow path will thus provide a relatively firm ride. The fluid flow is similar to that shown in FIG. 4 for piston rod 18.

Small amplitude compression and large amplitude compression of shock absorber 10 is the same as that illustrated above in FIGS. 5 and 6 for piston rod 18, respectively. During all compression strokes for shock absorber 10, all bores 486 are open providing for the dual path fluid flow.

Figure 12:
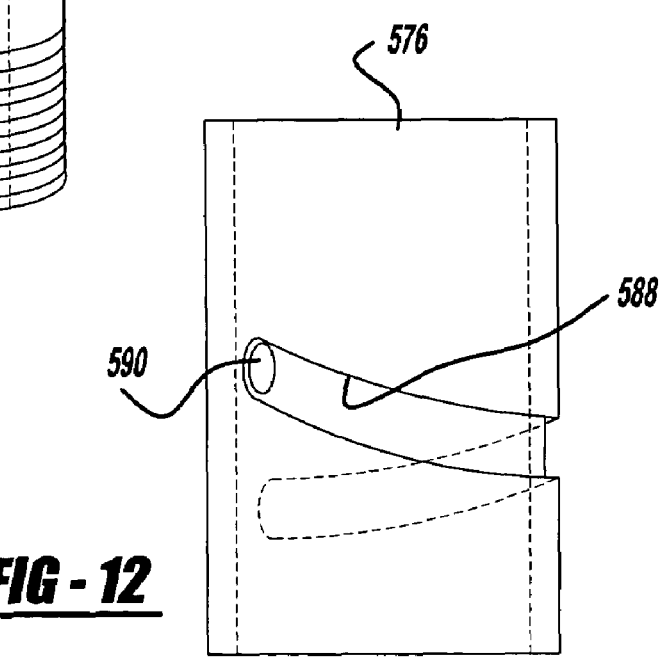
FIG. 12 is an enlarged view of a sleeve incorporating a metering system in accordance with another embodiment of the present invention.

Referring now to FIG. 12, a collar 576 in accordance with another embodiment of the present invention is illustrated. Collar 576 is also designed to replace collar 376 and thus the discussion above regarding shock absorber 310 also applies to collar 576. The difference between collar 376 and collar 576 is that bore 390 and tapered slot 388 have been replaced with a helical groove 588 and a bore 590. Helical groove 588 extend axially along the outer surface of collar 576. Helical groove 588 has a depth that varies continuously over the length of helical groove 588. The depth of helical groove 588 is at its maximum valve adjacent bore 590 which provides communication between groove 588 and groove 384 and thus passage 374. Sliding sleeve 78 is slidingly received within pressure tube 14 and slidingly received on collar 576, similar to collar 376, to provide the multi-stage damping characteristics for shock absorber 310.

During small amplitude extensions of shock absorber 310, sliding sleeve 78 will only move a small amount with respect to collar 586 due to the friction with pressure tube 14 and thus does not restrict fluid flow through groove 588, bore 590, groove 384 and passage 374. The fluid flow is similar to that shown in FIG. 2 for piston rod 18.

During larger amplitude extensions of shock absorber 310, sliding sleeve 78 will move enough to cover a portion of bore 590 and possibly a portion of groove 588. The movement of sliding sleeve 78 with respect to collar 576 will cover more and more of groove 588. Fluid flow will flow from upper working chamber 20 though groove 588, bore 490, groove 384 and through passage 374 and into lower working chamber 22. The continuously varying depth of groove 588 will permit a gradual closing of the entire passage 374 which provides the advantage of the major reduction or elimination of the switching noise typical with a dual-stage damping device. Fluid flow from upper working chamber 20 into lower working chamber 22 still occurs through the two generally parallel paths but the second path is progressively being closed off as a function of the amplitude of the stroke. The variable depth of groove 588 thus provides the shock absorber designer the option of defining the curve between the soft damping characteristics of shock absorber 310 and the firm damping characteristics of shock absorber 310 and no longer requires him to accept a step function. The fluid flow is similar to that shown in FIG. 3 for piston rod 18.

Even larger amplitude extensions of shock absorber 310 causes sliding sleeve 78 to cover all of groove 588 to close fluid passage 374. Fluid flow from upper working chamber 20 into lower working chamber 22 occurs only through the first fluid path. This single flow path will thus provide a relatively firm ride. The fluid flow is similar to that shown in FIG. 4 for piston rod 18.

Small amplitude compression and large amplitude compression of shock absorber 310 is similar to that illustrated above in FIGS. 5 and 6, respectively, for piston rod 18. During compression strokes for shock absorber 310, groove 588 and bore 590 are open providing for the dual path fluid. The fluid flow is the same as that shown in FIGS. 5 and 6 for piston rod 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two-stage shock absorber comprising:
    a pressure tube defining a working chamber;
    a piston body slidably disposed within said pressure tube, said piston body dividing said working chamber into an upper working chamber and a lower working chamber;
    a piston rod extending entirely through said upper working chamber and projecting out of said upper working chamber, said piston rod being connected to said piston body;
    a first and second valve assembly attached to said piston body, said first and second valve assemblies providing a first and a second passageway, respectively, through said piston body;
    a third fluid passageway defined through said piston rod;
    a sleeve slidably disposed on an inner surface of said pressure tube and on said piston rod within said upper working chamber, said sleeve being operable to progressively close said third passageway when movement of said piston body with respect to said pressure tube exceeds a specified distance; and
    said third passageway being comprised of a single bore and a groove extending from said bore in a downward helical spiral along an outer surface of said piston rod to a terminal end.

2. The two-stage shock absorber according to claim 1 further comprising a depth of said groove decreasing from said bore to said terminal end.

3. The two-stage shock absorber according to claim 1 further comprising said sleeve being operable to progressively cover said bore and said groove when movement of said piston body with respect to said pressure tube exceeds a specified distance.

4. A two-stage shock absorber comprising:
    a pressure tube defining a working chamber;
    a piston body slidably disposed within said pressure tube, said piston body dividing said working chamber into an upper working chamber and a lower working chamber;
    a piston rod extending entirely through said upper working chamber and projecting out of said upper working chamber, said piston rod being connected to said piston body;
    a first and second valve assembly attached to said piston body, said first and second valve assemblies providing a first and a second passageway, respectively, through said piston body;
    a third fluid passageway defined through said piston rod;
    a sleeve slidably disposed on an inner surface of said pressure tube and on said piston rod within said upper working chamber, said sleeve being operable to progressively close said third passageway when movement of said piston body with respect to said pressure tube exceeds a specified distance;
    a collar attached to said piston rod, said collar defining said third fluid passageway; and
    said third passageway being comprised of a single bore and a groove extending from said bore in a downward helical spiral along an outer surface of said collar to a terminal end.

5. The two-stage shock absorber according to claim 4 further comprising a depth of said groove decreasing from said bore to said terminal end.

6. The two-stage shock absorber according to claim 4 further comprising said sleeve being operable to progressively cover said bore and said groove when movement of said piston body with respect to said pressure tube exceeds a specified distance.

* * * * *